United States Patent
Oka et al.

(10) Patent No.: US 10,319,087 B2
(45) Date of Patent: Jun. 11, 2019

(54) CONTROL SYSTEM, CONTROL DEVICE, IMAGE PROCESSING DEVICE, AND CONTROL METHOD

(71) Applicant: OMRON Corporation, Kyoto-shi, Kyoto (JP)

(72) Inventors: Minoru Oka, Moriyama (JP); Shinya Sawa, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/845,605

(22) Filed: Sep. 4, 2015

(65) Prior Publication Data

US 2016/0012577 A1 Jan. 14, 2016

Related U.S. Application Data

(63) Continuation of application No. PCT/JP2014/055992, filed on Mar. 7, 2014.

(30) Foreign Application Priority Data

Mar. 7, 2013 (JP) .................................. 2013-046013

(51) Int. Cl.
*G06K 9/54* (2006.01)
*G06T 7/00* (2017.01)
(Continued)

(52) U.S. Cl.
CPC ............ *G06T 7/0004* (2013.01); *G05B 19/05* (2013.01); *G05B 19/4188* (2013.01);
(Continued)

(58) Field of Classification Search
None
See application file for complete search history.

(56) References Cited

U.S. PATENT DOCUMENTS 5,208,762 A    5/1993  Charhut et al.
6,477,266 B1 * 11/2002  Asar ................ G01N 21/95607
                                                         382/144

(Continued)

FOREIGN PATENT DOCUMENTS

JP    2011-253469 A   12/2011
WO    2009118583 A1   10/2009

OTHER PUBLICATIONS

NVIDIA SDK 9.52 Code Samples (http://developer.download.nvidia.com/SDK/9.5/Samples/vidimaging_samples.html, Jan. 17, 2007).*

(Continued)

*Primary Examiner* — Randolph I Chu
(74) *Attorney, Agent, or Firm* — Metrolexis Law Group, PLLC

(57) ABSTRACT

A control system configured to use a database and a data storage area includes a control device for controlling a process executed on an object; and an image processing device arranged in association with the control device for taking an image of the object and processing image data acquired from taking the image of the object. The control device and the image processing device may work independently or collaboratively to send the database at least one of an attribute value or results information, and designation information in association with each other for the same object, the attribute value managed by the control device and corresponding to any attribute defined in the database, the results information representing a process result from the image processing device, and the designation information specifying a storage destination in the data storage area for the image data acquired from taking an image of the object.

10 Claims, 9 Drawing Sheets

(51) Int. Cl.
G05B 19/05 (2006.01)
G06F 17/30 (2006.01)
G05B 19/418 (2006.01)

(52) U.S. Cl.
CPC ... *G05B 19/41875* (2013.01); *G06F 17/3028* (2013.01); *G05B 2219/31323* (2013.01); *G05B 2219/32186* (2013.01); *G05B 2219/37028* (2013.01); *G06T 2207/30164* (2013.01); *Y02P 90/22* (2015.11); *Y02P 90/24* (2015.11); *Y02P 90/265* (2015.11)

(56) References Cited

U.S. PATENT DOCUMENTS

| | | | | |
|---|---|---|---|---|
| 7,447,996 | B1* | 11/2008 | Cox | G06Q 10/107 709/203 |
| 7,769,556 | B2* | 8/2010 | Heiden | G01M 11/0257 250/559.1 |
| 8,712,163 | B1* | 4/2014 | Osheroff | G06K 9/00 382/149 |
| 2002/0102526 | A1* | 8/2002 | Tsukamoto | G09B 7/00 434/362 |
| 2003/0050893 | A1* | 3/2003 | Hirabayashi | G06Q 20/382 705/52 |
| 2004/0207836 | A1* | 10/2004 | Chhibber | G01N 21/4738 356/237.4 |
| 2006/0106642 | A1* | 5/2006 | Reicher | G06F 19/321 705/2 |
| 2008/0056556 | A1* | 3/2008 | Eller | G06F 19/327 382/142 |
| 2009/0150519 | A1 | 6/2009 | McIntyre | |
| 2010/0046791 | A1* | 2/2010 | Glickman | G06K 9/209 382/100 |
| 2010/0241380 | A1* | 9/2010 | Cookson | G06T 7/0004 702/84 |
| 2011/0093109 | A1 | 4/2011 | Budzinski et al. | |
| 2011/0276445 | A1* | 11/2011 | Chess | G06Q 10/06 705/32 |
| 2013/0058553 | A1* | 3/2013 | Yonezawa | G06K 9/0061 382/131 |
| 2013/0155229 | A1* | 6/2013 | Thornton | H04N 7/18 348/143 |
| 2013/0195326 | A1* | 8/2013 | Bear | A61J 7/0076 382/128 |
| 2013/0202187 | A1* | 8/2013 | Goren | G01N 21/9501 382/149 |
| 2014/0023264 | A1* | 1/2014 | Branch | G06K 9/78 382/141 |
| 2014/0036076 | A1* | 2/2014 | Nerayoff | H04N 7/181 348/148 |
| 2014/0118756 | A1* | 5/2014 | Shepherd | G06T 11/60 358/1.6 |
| 2014/0119644 | A1* | 5/2014 | Zheng | G06K 9/00 382/165 |
| 2014/0217177 | A1* | 8/2014 | Bell | G06Q 10/08 235/454 |
| 2014/0233842 | A1* | 8/2014 | Gardner | G06K 9/00 382/143 |
| 2016/0035105 | A1* | 2/2016 | Martz | H04N 7/17336 382/107 |

OTHER PUBLICATIONS

Loren Shure, Loren on the Art of MATLAB, Using GPUs in MATLAB, https://blogs.mathworks.com/loren/2012/02/06/using-gpus-in-matlab/#24, Feb. 6, 2012.*

The Communication pursuant to Article 94(3) EPC dated Apr. 17, 2019 in a counterpart European patent application.

* cited by examiner

| Serial No. | Device No. | Part No. | Process Date | Inspection Date | Inspection Result | Inspection Image |
|---|---|---|---|---|---|---|
| 0001 | 00A0 | 0011 | 20130228120000 | 20130228120020 | Passed | ¥storage¥image¥data001.xx |
| 0002 | 00A0 | 0011 | 20130228120005 | 20130228120025 | Failed | ¥storage¥image¥data002.xx |

CONTROL SYSTEM, CONTROL DEVICE, IMAGE PROCESSING DEVICE, AND CONTROL METHOD

TECHNICAL FIELD

The present invention relates to a control system configured to use a database and a data storage area, a control device and image processing device suited thereto, and a control method used in the control system.

BACKGROUND ART

Typically, controlled objects such as the machines and equipment used at many production sites are controlled by control devices such as programmable controllers (also referred to below as a programmable logic controller, PLC). The information used to manage a control system containing these kinds of control devices are largely collected and analyzed on higher-level computers.

More specifically, there is a need to be able to perform fault analysis and state analysis during the manufacturing process. To address this need, Japanese Unexamined Patent Application Publication No. 2011-253469 (Patent Document 1) discloses a product inspection information recording system that allows swift and easy ways to understand issues with the products even with a plurality of inspection parameters related to the product. The product inspection information recording system is configured such that the inspection results data includes weight data as well as foreign-particle presence data for the product.

TECHNICAL PROBLEM

The information used to manage a control system may include, for instance identification information and various inspection results related to the controlled object. The inspection results may include the image data acquired by taking an image of an object (e.g., a work piece) being manipulated by the control object. From a production management perspective, which aims to reduce the percentage defects and the like, this image data acquired by taking an image of the object is also preferably included as a management parameter.

A database is generally configured for the retention and management of text based information, however it is not as simple for a database to handle image data. Further, a control system that manages the production and inspection of multiple work pieces needs to collect and analyze a huge amount of information. A generic production site usually manages a plurality of stages such as a fabrication stage and an inspection stage. When managing these production stages in their entirety, it is also necessary to mutually map the information acquired during these stages with the respective stages.

Therefore, the desire is for a configuration that allows more effective analyses of the various pieces of information managed by the control system and the image data from a corresponding object.

SUMMARY

One aspect of the present invention provides a control system configured to use a database and a data storage area. The control system includes a control device for controlling a process executed on an object; and an image processing device arranged in association with the control device for taking an image of the object and processing image data acquired from taking the image of the object. The image data acquired by the image processing device may be configured for storage in a data storage area. The control device and the image processing device may work independently or collaboratively to send the database at least one of an attribute value or results information, and designation information in association with each other for the same object, the attribute value managed by the control device and corresponding to any attribute defined in the database, the results information representing a process result from the image processing device, and the designation information specifying a storage destination in the data storage area for the image data acquired from taking an image of the object.

The control device may provide the image processing device with at least one of identification information and location information for each piece of image data acquired by the image processing device as designation information, where the identification information is created when storing the image data in the data storage area, and the location information represents the location where the image data is stored.

Alternatively, the image processing device in the control system may be configured to store each piece of image data acquired in the data storage area in accordance with a preliminarily determined rule, and provide the control device the designation information corresponding to each piece of image data stored.

The control device in the control system may be further configured to send the database at least one of information managed by the control device and information managed by the image processing device together with designation information for specifying the image data stored in the data storage area.

Alternatively the image processing device in the control system may be further configured to store each piece of image data acquired in the data storage area, and provide the control device with time information representing the timing at which the image data was stored.

The control device in control system may be further configured to send the database at least one of information managed by the control device and information managed by the image processing device together with the time information; and a process is executed in the database to create a mapping for the corresponding image data on the basis of the time information.

Another aspect of the present invention proposes a control device configured to communicate with an external storage device and an image processing device. The control device includes a controller, and a storage unit used to store a user program. The controller executes the user program to control processes executed on an object. The controller configured to execute a process to store machining data related to the control associated with the object in the storage unit; a process to send the image processing device designation information specifying a storage destination in the external storage device where the image processing device is to store the image data; and a process to send the external storage device the machining data and the designation information for the object corresponding to the machining data.

Another aspect of the present invention proposes an image processing device configured to communicate with an external storage device and a control device. The image processing device includes a controller, an interface for acquiring image data by taking an image of an object, and a storage unit used for storing the image data. The controller configured to execute a process initiating image processing of the image data; a process sending the control device results generated from the image processing; and a process sending the external storage device the acquired image data in accordance with designation information from the control device specifying the storage destination of the image data on the external storage device.

The image processing device may be further configured to store each piece of image data acquired in the external storage device, and provide the control device with time information representing the timing at which the image data was stored.

Another aspect of the present invention provides a control method in a control system configured to use a database and a data storage area. The control method including steps of: controlling a process a control device executes on an object; executing a process on image data acquired from an image processing device arranged in association with the control device taking an image of the object; storing the image data acquired by the image processing device in the data storage area; and causing the control device and the image processing device to work independently or collaboratively to send the database at least one of an attribute value or results information, and designation information in association with each other for the same object, the attribute value managed by the control device and corresponding to any attribute defined in the database, the results information representing a process result from the image processing device, and the designation information specifying a storage destination in the data storage area for image information acquired from taking an image of the object.

Effects

Therefore, the present invention provides for more effective analyses of the various pieces of information managed by the control system and the image data from a corresponding object.

BRIEF DESCRIPTION OF THE DRAWINGS

FIG. 2 illustrates an example of analysis results output from an analysis device in a production system according to the embodiments;

FIG. 3 illustrates an example of a data structure in a database in a production system according to the embodiments;

DETAILED DESCRIPTION

Figure 1:
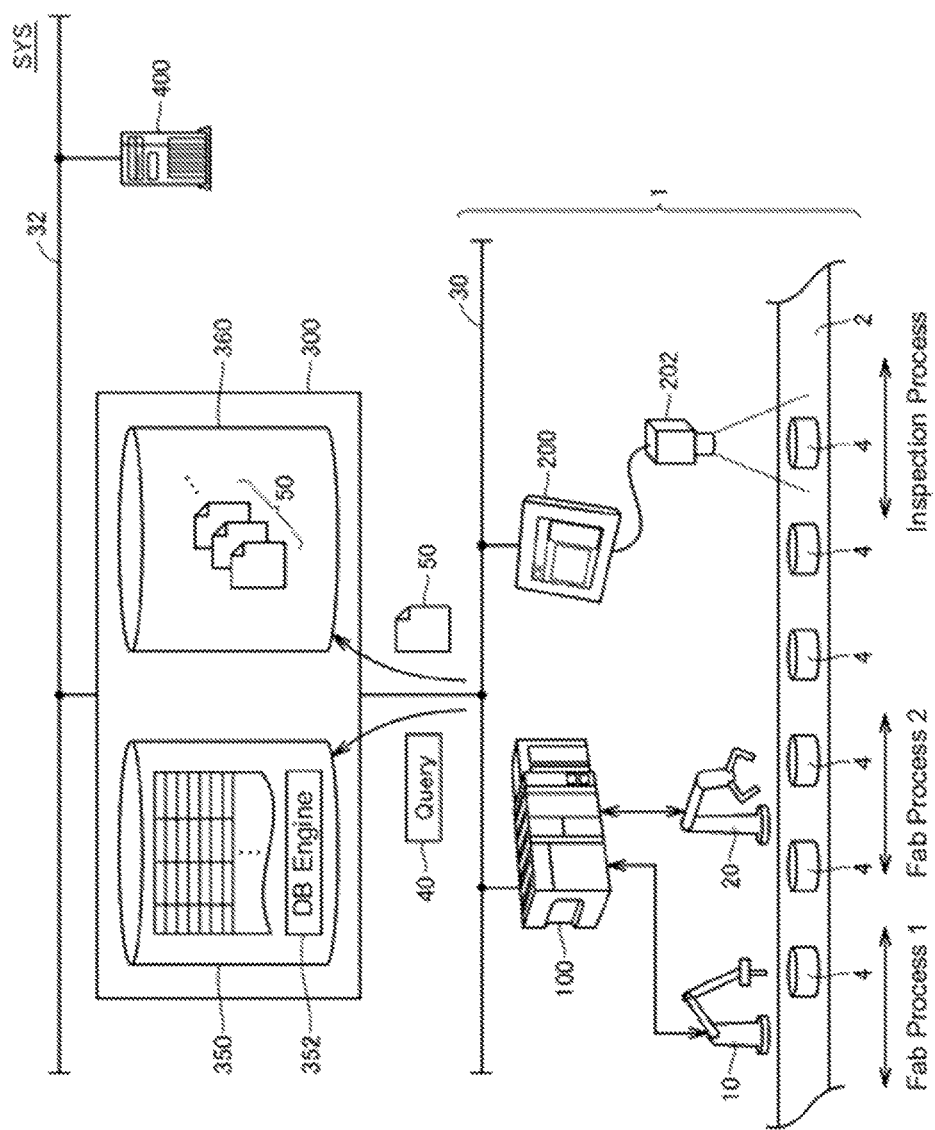
FIG. 1 is a schematic diagram illustrating a configuration of a production system including a control system according to the embodiments.

Embodiments of the present invention will be described in detail with reference to the drawings. The same or corresponding elements within the drawings will be given the same reference numerals and the explanations therefor will not be repeated.

A. Overall Configuration

First, an overall configuration of a control system according to the embodiments is described. FIG. 1 is a schematic diagram illustrating a configuration of a production system SYS including a control system 1 according to the embodiments.

Referring FIG. 1, production system SYS includes a control system 1, an information gathering device 300, and an analysis device 400. The control system 1 includes a programmable controller (referred to below as a PLC, 100), and a visual sensor 200. Assume that these devices are connected via a network 30.

The PLC 100 is a specific example of a typical implementation of a control device that controls the processing executed on a workpiece (hereafter, "object") handled by the controlled object. This manner of control device is not limited to a PLC, and may be implemented in a general purpose computer, or in dedicated hardware.

In the production system SYS illustrated in FIG. 1, a robot 10 carries out a fabrication process (hereafter, "Fab Process 1") on workpieces 4 continuously transported thereto via a conveyor 2. Thereafter, a robot 20 carries out another fabrication process (hereafter, "Fab Process 2") on the workpieces 4. The PLC 100 controls the respective fabrication processes carried out by the robots 10 and 20, as well as transportation by the conveyor 2.

The visual sensor 200 determines whether or not the fabrication carried out by the robots 10 and 20 on a workpiece was suitable. The determination process carried out by the visual sensor 200 is referred to below as the "Inspection Process". Namely, the visual sensor 200 is a specific example of a typical image processing device setup in association with the PLC 100 (control device) to process the image data 50 acquired by taking an image of an object being handled, i.e., a workpiece 4. The image processing carried out in the visual sensor 200 includes, for instance, detecting the position of the workpiece 4 itself, determining whether the workpiece 4 is good or defective, and inspecting or tracking a specific section extracted from an image of the workpiece 4.

The information gathering device 300 and the analysis device 400 provided in the control system 1 are used in production management. These devices collect the information the control system 1 manages, analyze the information collected, and output the results to a user, as necessary.

The information gathering device 300 contains a database 350 and a data storage area 360. The database retains and manages the various information transmitted thereto from the control system 1. Data in the database 350 is updated via a database engine (DB engine, 352). Information from the control system 1 is typically transmitted as a query (Query, 40) which is composed of a character string representing a processing request.

The data storage area 360 may be provided as a file server, or the like, to receive and store the image data 50 transmitted thereto from the control system 1. The image data 50 acquired by the visual sensor 200 taking an image of a workpiece 4 may be transmitted directly or indirectly therefrom to the information gathering device 300 in the control system 1. That is, the data storage area 360 may be configured to store the image data 50 acquired by the visual sensor 200 (image processing device). In other words, the information gathering device 300 acts as an external storage device.

The control system 1 is thusly configured to use a database and a data storage area.

FIG. 1 illustrates a typical configuration example where the information gathering device 300 contains the database 350 and the data storage area 360; however, the information gathering device 300 is not limited to this configuration. Namely, the database 350 and the data storage area 360 may be packaged as different devices, or may be packaged in a single device. Moreover, the database 350 may be provided as the database functions stored in each of a plurality of devices that are integrated virtually. The data storage area 360 may be similarly implemented on a plurality of devices. Alternatively, the database 350 and the data storage area 360 may be packaged with at least one of the PLC 100 and the visual sensor 200.

Finally, the analysis device 400 may analyze the information stored in the information gathering device 300, and the image data 50 stored in the data storage area 360 in association with each other and output the results of the analysis to thereby assist with fault analysis or state analysis during production.

B. Analysis

Figure 2:
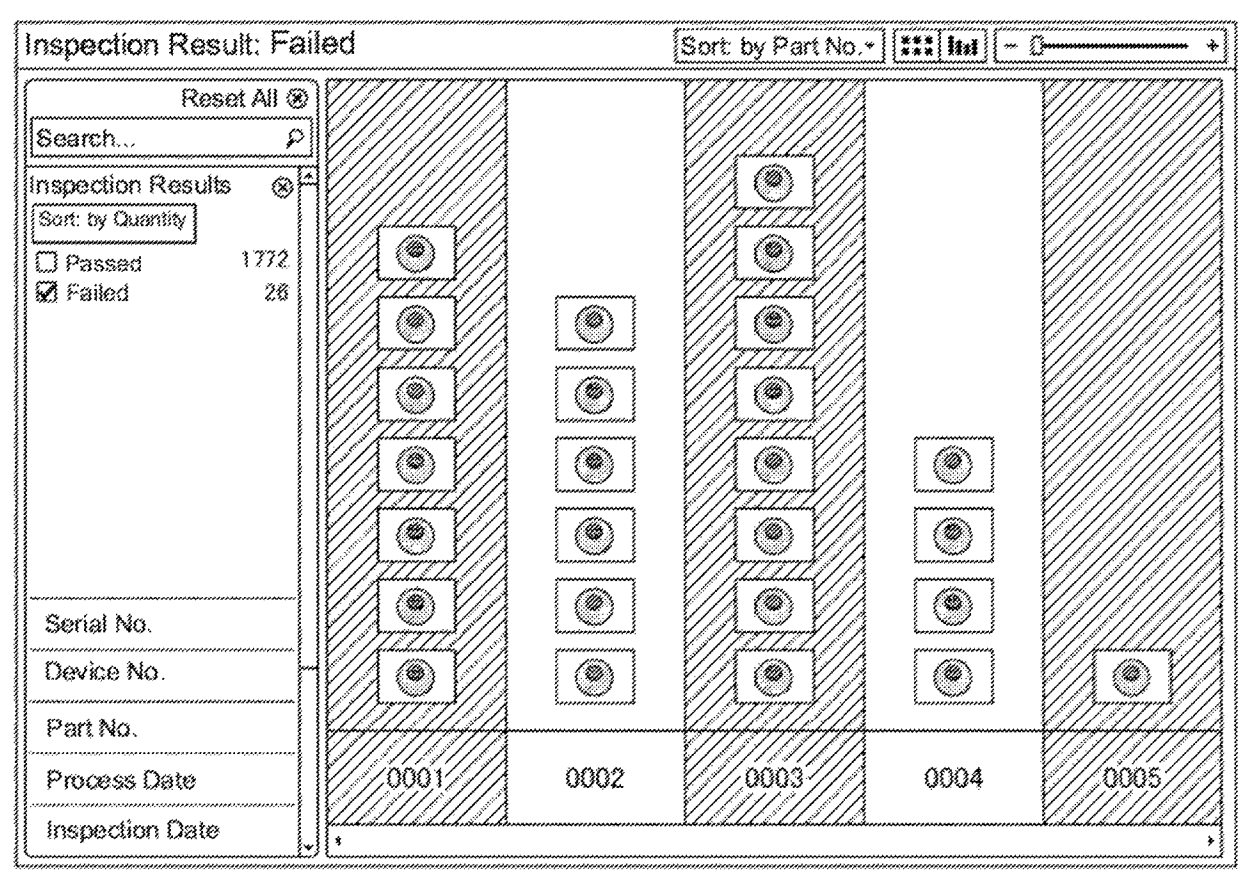

Next is an overview of the analysis provided by the production system SYS according to the embodiments. FIG. 2 illustrates an example of the analysis results output from the analysis device 400 in the production system SYS according to the embodiments.

Referring to FIG. 2, the analysis device 400 classifies the image data 50 stored in the data storage area 360 on the basis of the information associated therewith (such as, the attribute values defined for a plurality of different attributes), and displays the classified image data 50 in association with the attribute value used in the classification thereof. For instance, a plurality of attributes may be associated with each piece of image data 50, and assigned attribute names such as "Serial No.," "Device No.," "Part No.," "Process Date", "Inspection Date", "Inspection Results from Inspection Process (Pass/Fail)", and the like. In the analysis results illustrated in FIG. 2, the image data 50 having an inspection result from the inspection stage (attribute value) of "Fail" are grouped by "Part No.", with the image data 50 belonging to each of the groups also displayed. A magnified view may be provided for a selected image data 50 once the image data 50 is selected.

The analysis device may be further configured such that selecting a desired attribute (attribute name) associated with the image data 50 groups and displays the image data 50 according to the selection. FIG. 2 illustrates an example where the image data is grouped according to "Inspection Results from Inspection Process (Pass/Fail)", and "Part No."; however, an additional attribute may be used for grouping. For instance, the analysis results illustrated in FIG. 2 may be further grouped by "Process Date" to allow analysis of the chronological variations in the state of the production process. In this case, the image data 50 may be displayed in relation to two-dimensional coordinates defined by the "Part No." and the "Process Date".

The production system SYS according to the embodiments is capable of providing analysis from the perspective of a desired attribute in relation to the multitude of image data 50 taken from the production site in this manner, and thus facilitate understanding the status and trends at the production site. Additionally, as illustrated in FIG. 2 the image data 50 is displayed as the analysis result, and therefore allows for diverse analysis. Moreover, data mining techniques may be adopted to facilitate fault analysis during production using the plurality of image data 50.

C. Database

Next is described a data structure in the database used for implementing the above described kind of analysis.

The control system 1 according to the embodiments provides a foundation for analysis using the above-described plurality of image data 50. That is, mappings must be automatically generated between the information in the information gathering device 300 to carry out analysis using the information from the control system 1 (query 40) and the image data 50. Therefore, in the control system 1, the PLC 100 (control device) and the visual sensor 200 (image processing device) work independently or collaboratively to transmit at least one of information related to an attribute or results information, and designation information to the database 350 in association with each other for the same workpiece 4 (object). The information related to the attribute is managed by the PLC 100 and corresponds to any attribute defined in the database 350; the results information represents a process result from the visual sensor 200, and the designation information specifies a storage destination in the data storage area 360 for the image data 50 acquired from taking an image of the work piece 4. The visual sensor 200 may transmit the image data 50 to the information gathering device 300 directly or indirectly to store the image data 50 thereon. Whereas, for each workpiece 4, the database 350 stores the information representing where the image data 50 transmitted from the visual sensor 200 is located. Hereby, referencing the database 350, the system may uniquely specify which of any of the locations in the data storage area 360 holds the image data 50 corresponding to each of the workpieces 4.

FIG. 3 illustrates an example of a data structure in a database 350 in a production system SYS according to the embodiments. A single record is associated with a single workpiece 4 in the data structure illustrated in FIG. 3. Note that FIG. 3 illustrates an individual table structure wherein a plurality of columns is provided per single record; however if a relational database is adopted, a plurality of tables may be mapped to each other.

Referring to FIG. 3, the table in the database 350 defines columns 3501, 3502, 3503, 3504, 3505, 3506 corresponding to "Serial No.," "Device No.," "Part No.," "Process Date," "Inspection Date," "Inspection Results from Inspection Process (Pass/Fail)" respectively. These columns correspond to information stored in at least one of the PLC 100 and the visual sensor 200. Another column 3507 stores a character string representing the location of the image data 50 obtained by the visual sensor 200 taking an image of each of the workpieces 4. Referencing this kind of table, the information in each record (i.e., each workpiece 4) and the corresponding image data 50 may be uniquely mapped.

After describing the configuration of a device included in the production system SYS below, various implementations are described which are used to map the workpieces and the image data 50 as illustrated in FIG. 3.

D. Configuration of PLC 100

Figure 4:
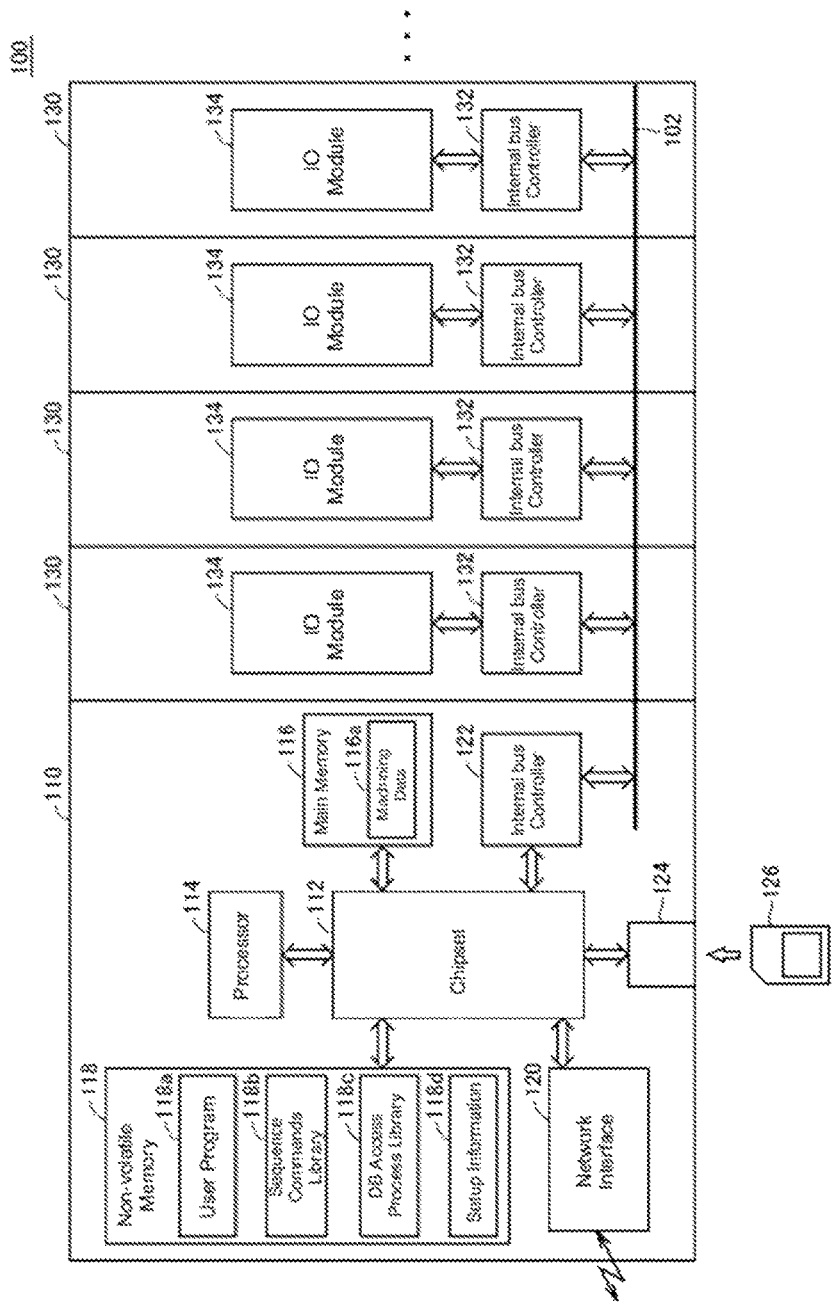
FIG. 4 is a schematic diagram illustrating a configuration of a PLC according to the embodiments.

Next, the configuration of a PLC 100 according to the embodiments is described. FIG. 4 is a schematic diagram illustrating a configuration of a PLC 100 according to the embodiments.

Referring to FIG. 4, the PLC 100 includes a CPU unit 110 that carries out control processing, and one or more input output (10) units 130. These units are configured to mutually exchange data via an internal bus 102. Additionally, a power unit (not shown) supplies power of the appropriate voltage to the units.

The CPU unit 110 contains a chipset 112, a processor 114, a main memory 116 and non-volatile memory 118 which serve as a storage unit, a network interface 120, an internal bus controller 122, and a memory card interface 124. The chipset 112 and the other components are connected to each other via various buses.

Typically, the chipset 112 and the processor 114 are configured based on a general purpose computer architecture. In more concrete terms, the chipset 112 exchanges internal data with the components connected thereto, and generates the necessary command codes for the processor 114. The chipset 112 includes a function for caching data and the like obtained through the computations executed in the processor 114. The chipset 112 sends the processor 114 the command codes sequentially in accordance with an internal clock. The processor 114 interprets and executes these command codes in the order received. Any desired configuration may be adopted for the processor 114 in place of a single processor including a single core. For example, configurations including a plurality of single-core processors, a plurality of single processors, or a plurality of multi-core processors, and the like may be adopted.

The CPU unit 110 includes a volatile main memory 116 and a non-volatile memory 118 as the storage means. The main memory 116 stores the various programs that should be run on the processor 114, and may also be used as a working memory when the various programs are run. The main memory 116 may also be used storage area that stores machining parameter data, or parameters in relation to the processing carried out on the object. More specifically, the main memory 116 stores machining data 116a. The details regarding the machining data 116a are described later.

The non-volatile memory 118 permanently stores the operating system (OS), system program, user program, data definition information, log information, and the like. More specifically, the non-volatile memory 118 stores a user program 118a, a sequence command library 118b, a DB access process library 118c, and setup information 118d. The user program 118a includes the commands necessary for controlling the controlled object, and may be executed by the processor 114 periodically or due to an event. The sequence command library 118b is called due to the user program 118a being run, and implements processing in accordance with defined sequence commands. The user program 118a also includes commands for accessing the database 350 in the information gathering device 300. When the processor 114 executes a command for accessing the database, the DB access process library 118c may be called to transmit the necessary data to or to receive the necessary from the database 350 via the network interface 120, and the like.

The setup information 118d stored in the non-volatile memory 118 contains information (network setting values, and the like) needed for accessing the information gathering device 300 (the database 350 and the data storage area 360).

The CPU unit 110 includes the network interface 120 and the internal bus controller 122, which serve as communication means therefor. The network interface 120 provides for data exchange between the visual sensor 200 and/or the information gathering device 300. The internal bus controller 122 provides for data exchange with the IO unit 130 via the internal bus 102.

The memory card interface 124 writes data to and reads data from a memory card 126 that is attachable to and removable from the CPU unit 110.

The IO unit 130 executes input and output processing. More specifically, the IO unit 130 includes an IO module 134 and an internal bus controller 132. The IO module 134 collects signals from a field and outputs data representing the signal values to the CPU unit 110, and/or outputs signal values to the field in accordance with data from the CPU unit 110. The various types of IO modules 134 may include a module for input and outputting analog signals, a module for inputting and outputting digital signals, a module providing temperature adjustment functions, and a module providing position alignment functions.

The internal bus controller 132 communicates with the internal bus controller 122 via the internal bus 102, to implement data exchange between the CPU unit 110 and the IO module 134.

E. Configuration of the Visual Sensor 200

Figure 5:
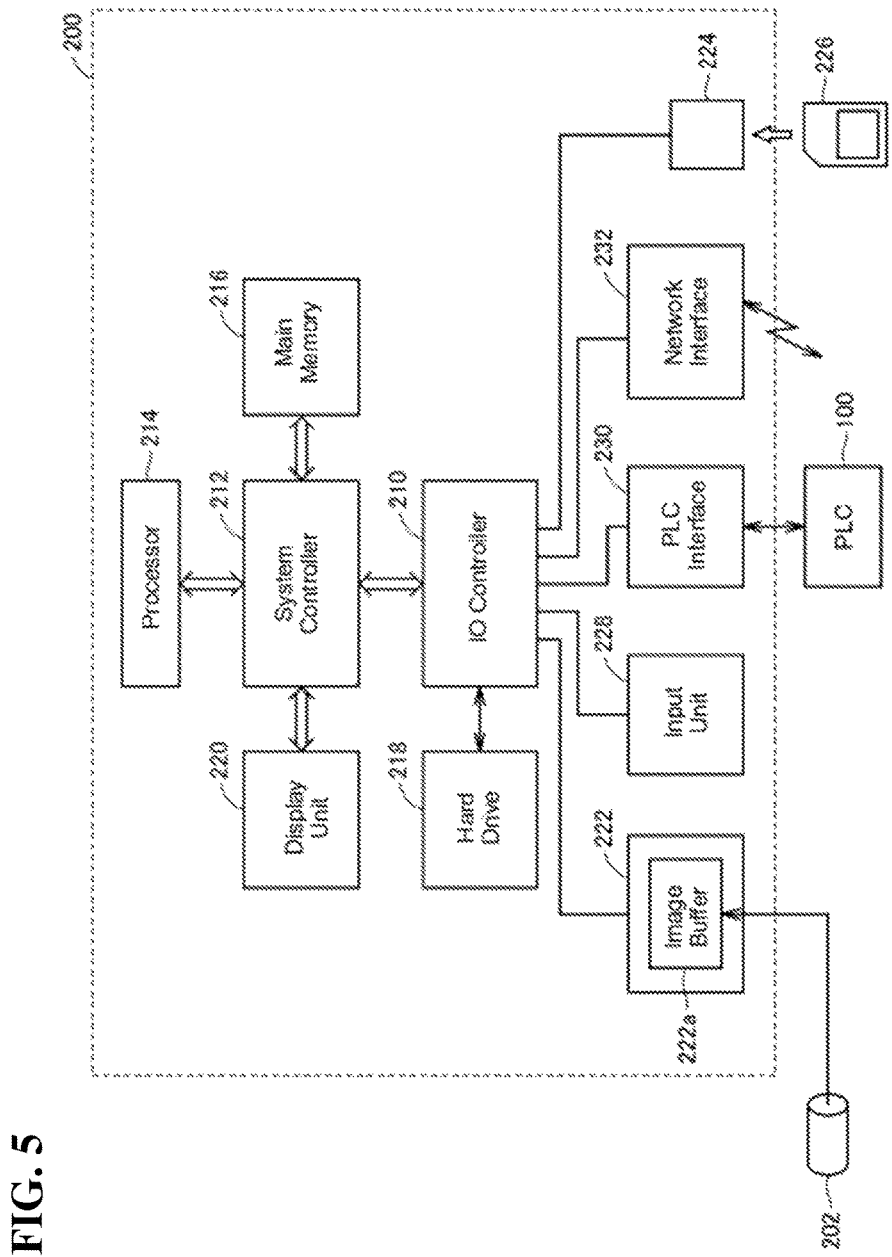
FIG. 5 is a schematic diagram illustrating a configuration of a visual sensor according to the embodiments.

Next, the configuration of a visual sensor 200 according to the embodiments is described. FIG. 5 is a schematic diagram illustrating a configuration of a visual sensor 200 according to the embodiments.

Referring to FIG. 5, the visual sensor 200 is connected to a camera 202 and executes predetermined image processing on image data 50 generated by the camera 202 taking an image of the object. More specifically, the visual sensor 200 includes an IO controller 210, a system controller 212, a processor 214, a main memory 216, a display unit 220, a hard drive 218, a camera interface 222, a memory card interface 224, an input unit 228, a PLC interface 230, and a network interface 232. These components are configured to mutually communicate data through the system controller 212.

The system controller 212 is respectively connected to the processor 214, the main memory 216, the display unit 220, and the IO controller 210 via buses. The system controller exchanges data with each of these components and controls the overall processing in the visual sensor 200.

The processor 214 exchanges programs and the like stored on the hard drive 218 with the system controller 212, and implements image processing by executing the programs in a prescribed order.

The main memory 216 is a volatile storage device. In addition to programs read from the hard drive 218, the main memory 216 stores image data acquired by the camera 202, data representing inspection results generated from imaging processing, work data, and the like.

The hard drive 218 is a non-volatile magnetic storage device. In addition to programs executed on the processor 214, the hard drive 218 stores various setup values and the like. The programs installable on the hard drive 218 may be run while stored on the memory card 226, and the like as later described. The hard drive 218 may also store image data.

The display unit 220 displays various images in accordance with internal commands from the system controller 212.

The IO controller 210 controls the exchange of data between the visual sensor 200 and the various devices connected thereto. More specifically, the IO controller 210 is connected the hard drive 218, the camera interface 222, the input unit 228, the PLC interface 230, the network interface 232, and the memory card interface 224.

The camera interface 222 acts as an intermediary transmitting data between the camera 202 and the processor 214. More specifically, the camera interface 222 may be connected to one or more cameras 202, and contains an image buffer 222a for temporarily storing the image data from a camera 202.

The input unit 228 is an input device that is typically a keyboard, a mouse, a touchscreen panel, or a dedicated console. The PLC interface 230 acts as an intermediary transmitting data between the processor 214 and the PLC 100. The network interface 232 acts as an intermediary transmitting data between the processor 214 and other personal computers or server devices and the like (not shown). The network interface 232 is typically made up of an Ethernet (Registered Trademark), a Universal Serial Bus (USB), or the like.

The memory card interface 224 writes data to and reads data from a memory card 226 that is attachable to and removable from the visual sensor 200.

F. Configuration of the Information Gathering Device 300

Figure 6:
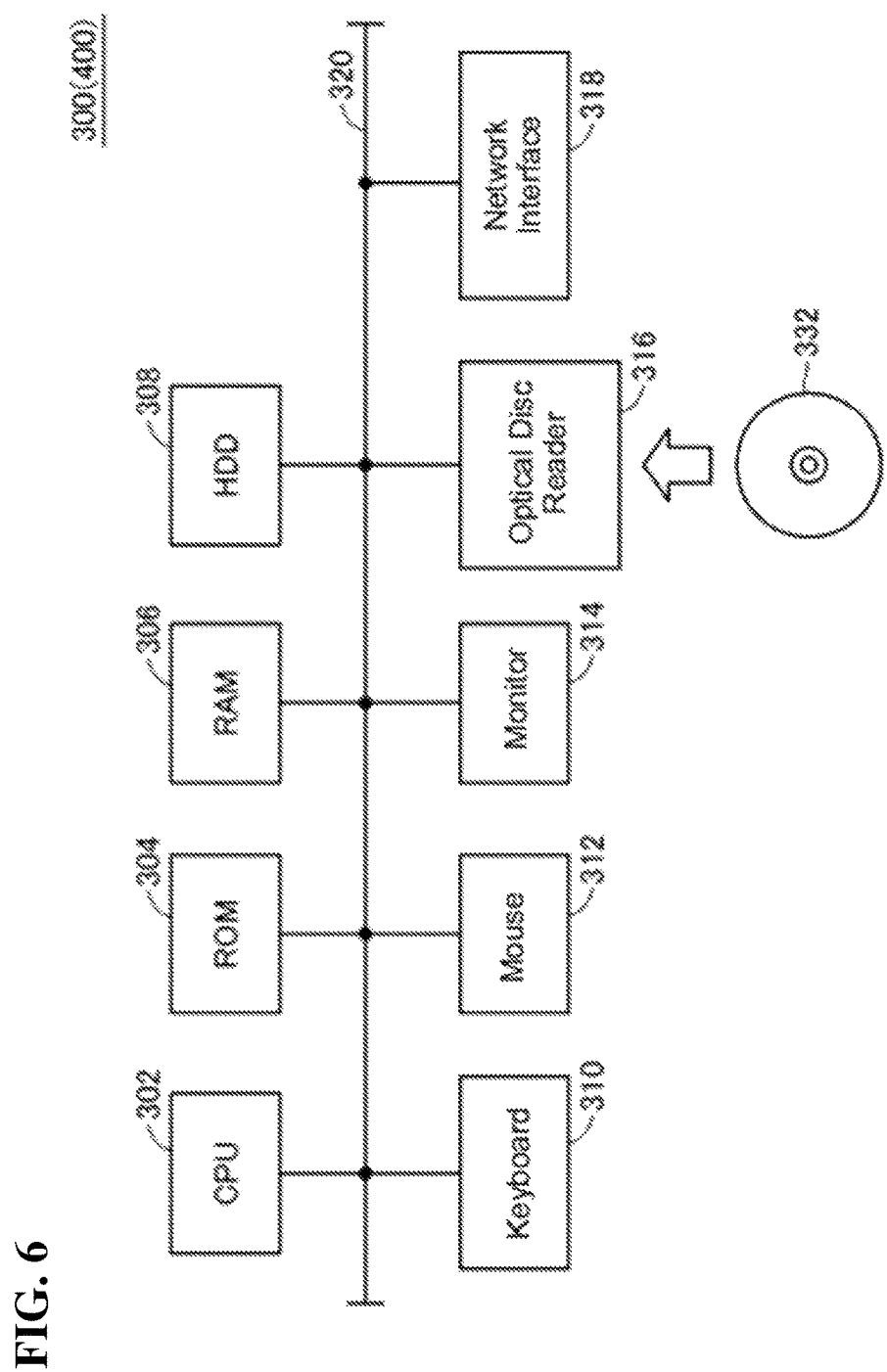
FIG. 6 is a schematic diagram illustrating a configuration of an information gathering device according to the embodiments.

Next, the configuration of an information gathering device 300 according to the embodiments is described. FIG. 6 is a schematic diagram illustrating a configuration of an information gathering device 300 according to the embodiments.

Referring to FIG. 6, the information gathering device 300 is a computer based on a general purpose computer architecture. More specifically, the information gathering device 300 includes a CPU 302 for executing the various programs including an OS; a read-only memory (ROM) 304 for storing a Basic Input Output System (BIOS) and various data; a RAM memory 306 which provides a working area for storing data necessary for executing the programs in the CPU 302; and a hard drive (HDD) 308 for permanently saving the programs and the like executed on the CPU 302. The hard drive 308 provides the database 350 and the data storage area 360 illustrated in FIG. 1.

The information gathering device 300 further includes a keyboard 310 and a mouse 312 for accepting operational input from a user, and a monitor 314 for presenting various information to the user. The information gathering device 300 additionally includes a network interface 318 for communicating with the PLC 100 and the visual sensor 200.

Various processing programs that may be executed on the information gathering device 300 are stored and run from an optical storage medium 332. The various processing programs stored on the optical storage medium are read by an optical disc reader 316, and transferred to and stored on the hard drive 308. Alternatively, the information gathering device may be configured to download a program from an upper level host computer, and the like through the network.

G. Configuration of the Analysis Device 400

The configuration of the analysis device 400 according to embodiments of the present invention is identical to the configuration of the information gathering device 300 illustrated in FIG. 6, and thus and explanation thereof will not be repeated here.

H. First Embodiment

Described is a first embodiment where the PLC 100 actively instructs the visual sensor 200 of the storage location of image data 50 obtained by taking an image of an object, i.e., a workpiece 4. In the first embodiment, the PLC 100 manages information gathered during Fab Process 1 and Fab Process 2; this information is collectively referred to below as "machining data". On the other hand, the visual sensor 200 manages information related to the results from the inspection process; this information is referred to below as "inspection data". As above described, the visual sensor 200 takes an image of the workpiece 4 and generates image data 50.

The machining data 116a (refer to FIG. 4) includes information such as "Serial No.," "Device No.," "Part No.," "Process Date," "Process Device Settings," and the like. The inspection data includes information such as "Serial No.," "Device No.," "Inspection Date," "Inspection Results from Inspection Process (Pass/Fail)," "Measurement Value," and the like. The "Measurement Value" may contain, for instance, a correlation value representing a degree of match with a model image.

In the first embodiment the PLC 100 generates a query containing machining data held in the PLC 100 and inspection data output by the visual sensor 200, and transmits the query to the database 350. The image data 50 generated by the visual sensor 200 is also transmitted for storage to the data storage area 360. To facilitate mapping of the above-described image data 50 illustrated in FIG. 3, the PLC 100 instructs the visual sensor 200 of a storage destination for the image data 50 in advance, and includes the preliminarily instructed storage destination information in the query.

That is, the PLC 100 (control device) provides the visual sensor 200 (image processing device) with at least one of identification information and location information for each piece of image data 50 acquired by the visual sensor 200 (image processing device) as designation information, the identification information created when storing the image data 50 in the data storage area 360, and the location information representing the location where the image data 50 is stored. The visual sensor 200 (image processing device) stores each piece of image data 50 acquired in the data storage area 360 in accordance with the corresponding designation information sent from the PLC 100 (control device).

To provide the visual sensor 200 with the designation information (storage destination), the PLC 100 stores at least the setup information (setup information 118d illustrated in FIG. 4) the visual sensor 200 uses to access the database 350 and the data storage area 360. This setup information may contain the Internet Protocol (IP) address, network domain, folder name in the storage destination, and the like of the information gathering device 300. This setup information may also be preliminarily created on the PLC 100 on the basis of information from a user controlling the information gathering device 300 and the like. Alternatively, the PLC 100 may send an inquiry message over a network 30, and acquire the necessary setup information on the basis of a response from the information gathering device 300.

On the other hand, the PLC 100 (control device) transmits to the database 350 at least one of the information managed by the PLC 100 (typically, machining data) and the information managed by the visual sensor 200 (typically, inspection data), together with designation information for specifying the image data 50 stored in the data storage area 360.

With this processing the image data 50 and the machining data, and the inspection data can be uniquely mapped to each other. A more concrete example of the procedure is described with reference to a sequence diagram.

Figure 7:
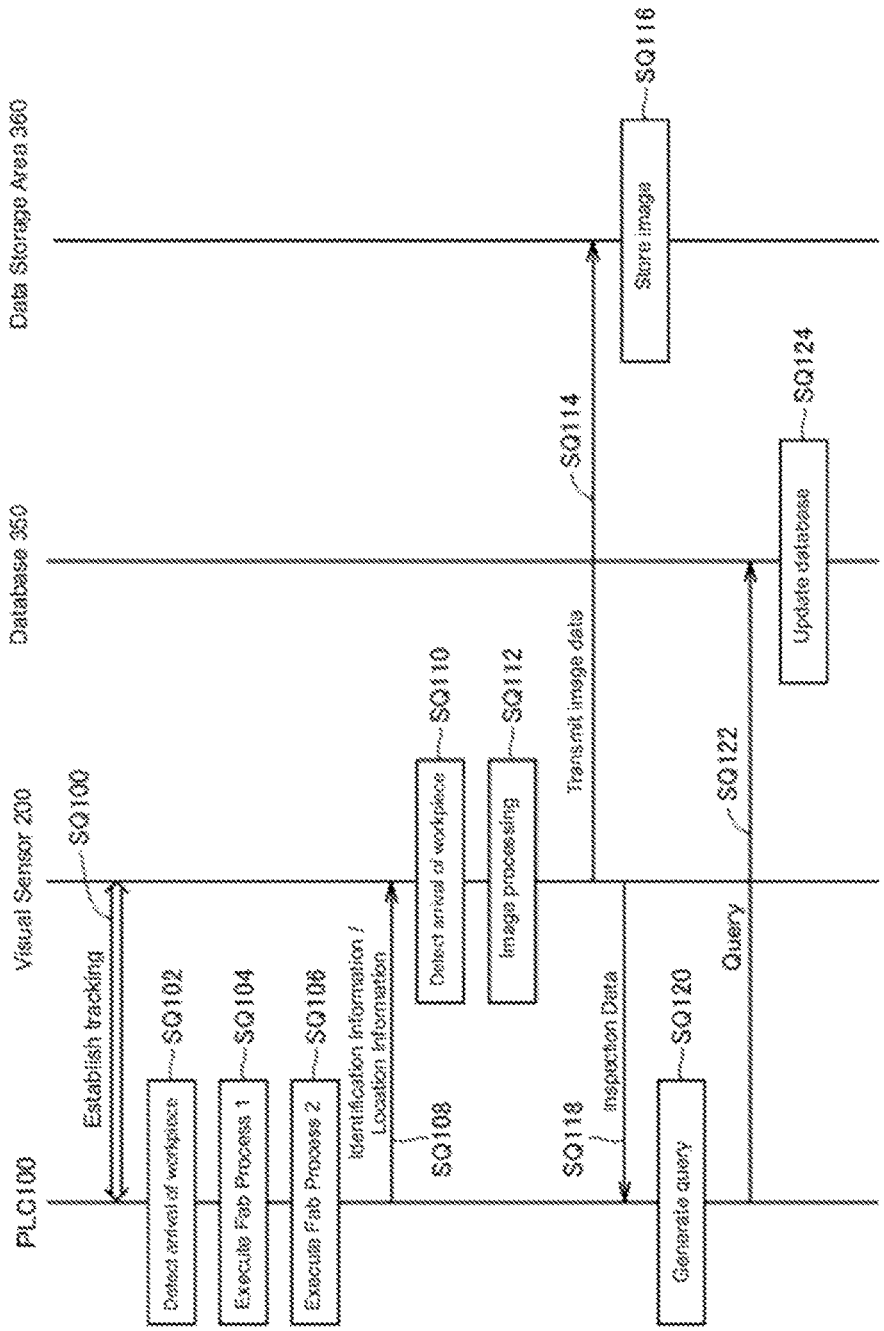
FIG. 7 is a sequence diagram illustrating a processing procedure in the production system according to a first embodiment.

FIG. 7 is a sequence diagram illustrating a processing procedure in the production system SYS according to the first embodiment. FIG. 7 illustrates a specific data exchange procedure between the PLC 100, the visual sensor 200, and the information gathering device 300 (the database 350 and the data storage area 360).

Referring to FIG. 7, first, tracking is established between the PLC 100 and the visual sensor 200 (sequence SQ100). Tracking is a process of identifying the positional relationship (relative offset, and the like) between the PLC 100 and the visual sensor 200. For instance, a reference workpiece may be placed on a conveyor 2, and an amount of offset calculated between the timing at which the PLC 100 detects the arrival of the reference workpiece, and the timing at which the visual sensor 200 detects the arrival of the reference workpiece (alternatively an offset time or the displacement of the conveyor 2 may be calculated); the result is then set as a tracking offset value. The data for the same workpiece 4 can be identified in the machining data maintained by the PLC 100, and the inspection data maintained by the visual sensor 200 using this offset value. Actual operations begin once tracking is established.

The PLC 100 first detects the arrival of the workpiece 4 (sequence SQ102), and initiates the execution of Fab Process 1 on the workpiece 4 (sequence SQ104). The related machining data is generated and updated with the execution of Fab Process 1. Next, the PLC 100 initiates the execution of Fab Process 2 on the workpiece 4 processed in Fab Process 1 (sequence SQ106). The related machining data is generated and updated with the execution of Fab Process 2.

The PLC 100 then transmits designation information (identification information and/or location information) to the visual sensor 200 for the processed workpiece 4 (sequence SQ108). The designation information is used for specifying the image data 50 stored in the data storage area 360, while the identification information typically includes a file name. The location information contains the directory name or the folder name of where the image data 50 is stored. For example, when the image data 50 having different filenames for each individual workpiece 4 are stored in the same folder (e.g., as depicted by the file names in column 3507 illustrated in FIG. 3 where the numbers in the column are incremented), transmitting the identification information containing only the file name, for instance, is acceptable as the location information containing the folder name is unnecessary. Whereas, when the filename (e.g., image.jpg) is identical but the image data is stored in different folders for each of the workpieces 4, transmitting only the location information is acceptable as the identification information is unnecessary. Moreover, the image data stored in the data storage area 360 may be specified using a Uniform Resource Locator (URL) and the like; in this case, both the location information and the identification information are transmitted. The visual sensor 200 sequentially stores the designation information transmitted from the PLC 100.

The visual sensor 200 detects the arrival of the workpiece 4 (sequence SQ110); the visual sensor 200 initiates image processing on the workpiece 4 on detecting the arrival thereof (sequence SQ112). This image processing includes an inspection process, such as whether the workpiece 4 is good or defective. The inspection process is where the visual sensor 200 acquires the image data 50 by taking an image of the workpiece 4, and the inspection data.

The visual sensor 200 transmits the acquired image data 50 to the data storage 360 in accordance with the designation information instructed in advance from the PLC 100 (sequence SQ114). The data storage area 360 stores the image data 50 transmitted from the visual sensor 200 (sequence SQ116). At the same time, the visual sensor 200 sends the PLC 100 the inspection data acquired from the inspection process (sequence SQ118).

On receiving the inspection data from the visual sensor 200, the PLC 100 uses the machining data acquired during Fab Process 1 and Fab Process 2, the inspection data from the visual sensor 200, and the designation information sent in advance to the visual sensor 200 to generate a query (sequence SQ120), and sends the query to the database 350 (sequence SQ122). Note that all the information is not necessarily transmitted using an individual query; the information may be divided among and transmitted via a plurality of queries.

The database 350 (DB engine 352) updates the database on the basis of a query transmitted from the PLC 100 (sequence SQ124).

Hereafter, the processing in the sequences SQ102 to SQ124 is repeated for each of the work pieces 4. Executing these processes builds the sort of database illustrated in FIG. 3, and uniquely maps the corresponding image data 50 for each of the workpieces 4 to the machining data and the inspection data and vice versa.

I. Second Embodiment

Next is described the second embodiment wherein the visual sensor 200 notifies the PLC 100 of the information specifying the stored image data 50, and the PLC 100 creates the mappings for the information to be transmitted. In the second embodiment the PLC 100 still manages the machining data, and the visual sensor 200 still manages the inspection data.

The image data 50 generated by the visual sensor 200 is transmitted to the data storage area 360 for storage. The PLC 100 also generates a query containing machining data held in the PLC 100 and the inspection data output by the visual sensor 200, and transmits the query to the database 350. The query the PLC 100 transmits to the database 350 contains designation information specifying the image data 50 the visual sensor 200 requested to have stored.

That is, the visual sensor 200 (image processing device) stores each piece of image data 50 acquired in the data storage area 360 in accordance with a preliminarily determined rule, and provides the PLC 100 (control device) with the designation information corresponding to each piece of image data 50 stored.

On the other hand, the PLC 100 (control device) sends the database 350 at least one of the information managed by the PLC 100 (typically, machining data) and the information managed by the visual sensor 200 (typically, inspection data), together with the designation information specifying the image data 50 stored in the data storage area 360.

With this processing the image data 50 can be uniquely mapped to the machining data and the inspection data and vice versa. A more concrete example of the procedure is described with reference to a sequence diagram.

Figure 8:
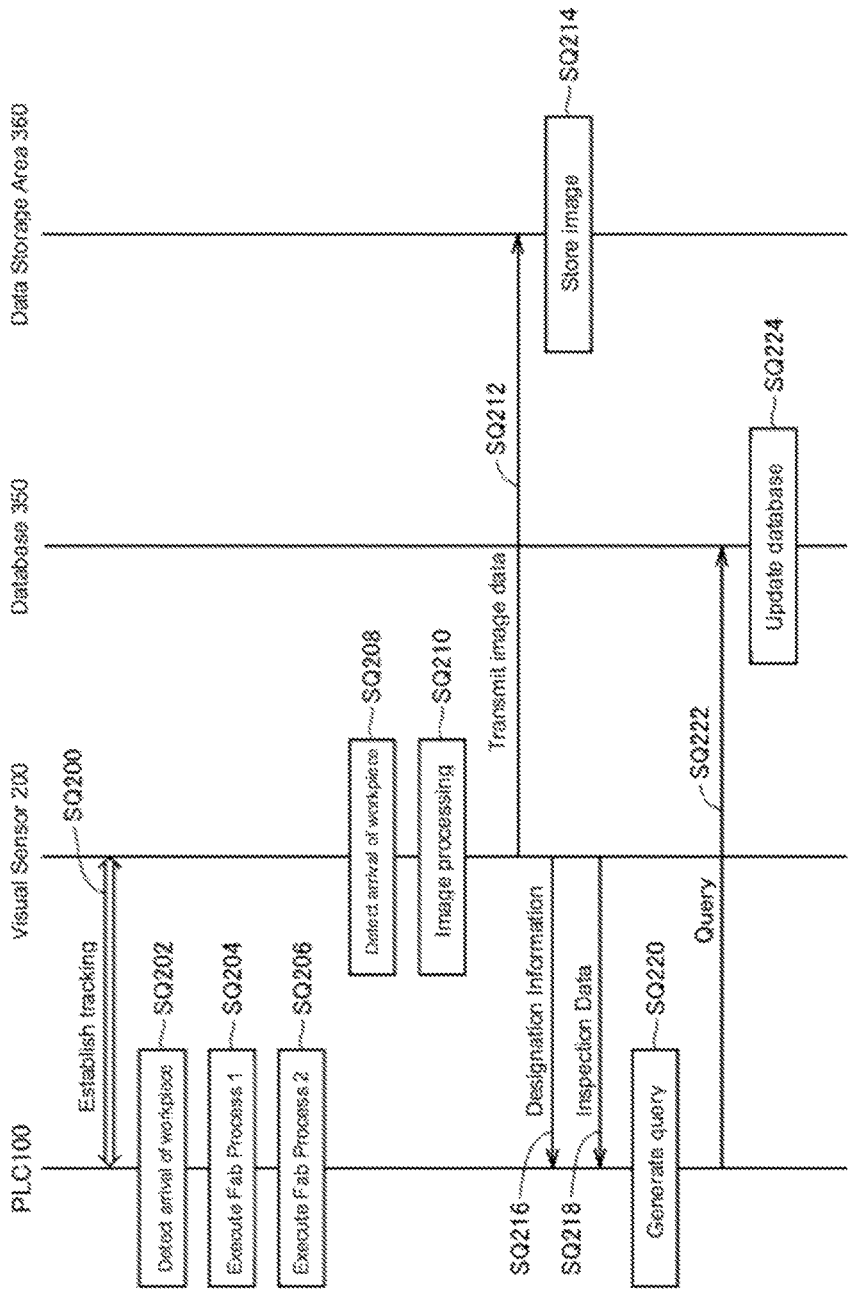
FIG. 8 is a sequence diagram illustrating a processing procedure in the production system according to a second embodiment.

FIG. 8 is a sequence diagram illustrating a processing procedure in the production system SYS according to a second embodiment. FIG. 8 illustrates a specific data exchange procedure between the PLC 100, the visual sensor 200, and the information gathering device 300 (the database 350 and the data storage area 360).

Referring to FIG. 8, tracking is first established between the PLC 100 and the visual sensor 200 (sequence SQ200). Here the tracking is established in the same manner as in the above-described first embodiment (sequence SQ100 in FIG. 7). Actual operations begin once tracking is established.

The PLC 100 first detects the arrival of the workpiece 4 (sequence SQ202), and initiates the execution of Fab Process 1 on the workpiece 4 (sequence SQ204). The related machining data is generated and updated with the execution of Fab Process 1. Next, the PLC 100 initiates the execution of Fab Process 2 on the workpiece 4 processed in Fab Process 1 (sequence SQ206). The related machining data is generated and updated with the execution of Fab Process 2.

The visual sensor 200 detects the arrival of the workpiece 4 (sequence SQ208); the visual sensor 200 initiates image processing on the workpiece 4 on detecting the arrival thereof (sequence SQ210). This image processing includes an inspection process, such whether the workpiece 4 is good or defective. The inspection process is where the visual sensor 200 acquires the image data 50 by taking an image of the workpiece 4, and acquires the inspection data.

The visual sensor 200 transmits the acquired image data 50 to the data storage 360 in accordance with predetermined rule (sequence SQ212). The data storage area 360 stores the image data 50 transmitted from the visual sensor 200 (sequence SQ214). The predetermined rule may be, for instance, incrementing the number included in a file name each time a workpiece 4 arrives. Alternatively, designation information could be established on the basis of the kind of rules described in the above first embodiment.

At the same time, the visual sensor 200 sends the PLC 100 the designation information (identification information and/or location information) specifying the image data 50 stored in the data storage area 360 (sequence SQ216), and also sends the PLC 100 the inspection data acquired from the inspection process (sequence SQ218).

On receiving the inspection data from the visual sensor 200, the PLC 100 uses the machining data acquired during Fab Process 1 and Fab Process 2, the inspection data from the visual sensor 200, and the designation information sent in advance from the visual sensor 200 to generate a query (sequence SQ220), and sends the query to the database 350 (sequence SQ222). Note that all the information is not necessarily transmitted using an individual query; the information may be divided among and transmitted via a plurality of queries.

The database 350 (DB engine 352) updates the database on the basis of the query transmitted from the PLC 100 (sequence SQ224).

Hereafter, the processing in the sequences SQ202 to SQ224 is repeated for each of the workpieces 4. Executing these processes builds the sort of database illustrated in FIG. 3, and uniquely maps the corresponding image data 50 for each of the workpieces 4 with and the machining data and inspection data and vice versa.

J. Third Embodiment

Next is described the third embodiment wherein the visual sensor 200 notifies the PLC 100 of time information representing the timing at which the image data 50 created by taking an image of a workpiece 4 is stored in the data storage area 360, and the PLC 100 creates a mapping in the database 350 by including the time information in the information transmitted therefrom. In the third embodiment, the PLC 100 still manages the machining data, and the visual sensor 200 still manages the inspection data.

The image data 50 generated by the visual sensor 200 is transmitted to the data storage area 360 for storage. The PLC 100 also generates a query containing the machining data held in the PLC 100 and the inspection data output by the visual sensor 200, and transmits the query to the database 350. The query the PLC 100 sends the database 350 contains time information for specifying the image data 50 the visual sensor 200 requested to have stored.

That is, the visual sensor 200 (image processing device) stores each piece of image data 50 acquired in the data storage area 360, and sends the PLC 100 (control device) the time information representing the timing at which the aforementioned image data 50 is stored.

On the other hand, the PLC 100 (control device) sends the database 350 at least one of the information managed by the PLC 100 (typically, machining data) and the information managed by the visual sensor 200 (typically, inspection data), together with the corresponding time information. The database 350 creates the mappings for the corresponding image data 50 on the basis of the time information transmitted from the PLC 100. That is, the database 350 (DB engine 352) references the data storage area 360 on the basis of the time information provided in a query received from the PLC 100, identifies the image data 50 stored at the time indicated in the aforementioned time information, and uniquely maps the query with the identified image data 50. In other words, the database 350 creates the mapping between the machining data and inspection data, and the corresponding image data 50 and vice versa. A concrete example of the procedure is described with reference to a sequence diagram.

Figure 9:
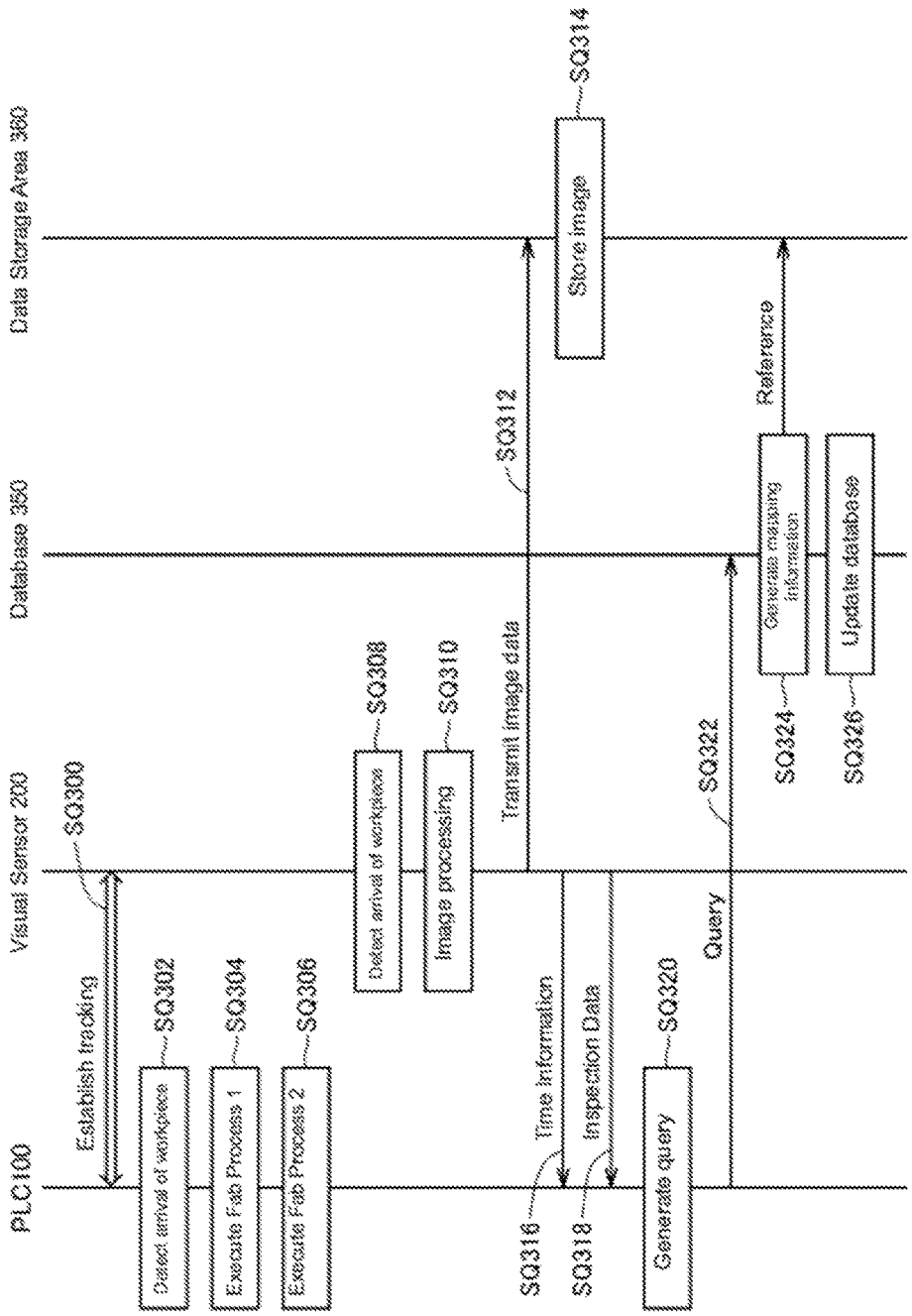
FIG. 9 is a sequence diagram illustrating a processing procedure in the production system according to a third embodiment.

FIG. 9 is a sequence diagram illustrating a processing procedure in the production system SYS according to a third embodiment. FIG. 9 illustrates a specific data exchange procedure between the PLC 100, the visual sensor 200, and the information gathering device 300 (the database 350 and the data storage area 360).

Referring to FIG. 9, first, tracking is established between the PLC 100 and the visual sensor 200 (sequence SQ300). Here, tracking is established in the same manner as in the above-described first embodiment (sequence SQ100 in FIG. 7). Actual operations begin once tracking is established.

The PLC 100 first detects the arrival of the workpiece 4 (sequence SQ302), and initiates the execution of Fab Process 1 on the workpiece 4 (sequence SQ304). The related machining data is generated and updated with the execution of Fab Process 1. Next, the PLC 100 initiates the execution of Fab Process 2 on the workpiece 4 processed in Fab Process 1 (sequence SQ306). The related machining data is generated and updated with the execution of Fab Process 2.

The visual sensor 200 detects the arrival of the workpiece 4 (sequence SQ308); the visual sensor 200 initiates image processing on the workpiece 4 on detecting the arrival thereof (sequence SQ310). This image processing includes an inspection process, such as whether the workpiece 4 is good or defective. The inspection process is where the visual sensor 200 acquires the image data 50 by taking an image of the workpiece 4, and the inspection data.

The visual sensor 200 transmits the acquired image data 50 to the data storage area 360 (sequence SQ312). The data storage area 360 stores the image data 50 transmitted from the visual sensor 200 (sequence SQ314). At this point, the filename for the image data 50 to be stored in the data storage area 360 can be any desired name so long as the name does not already exist for another piece of image data 50.

At the same time, the visual sensor 200 sends the PLC 100 the timing information indicating the time at which the image data 50 was stored in the data storage area 360

(sequence SQ316), and also sends the PLC 100 the inspection data acquired from the inspection process (sequence SQ318).

On receiving the inspection data from the visual sensor 200, the PLC 100 uses the machining data acquired during Fab Process 1 and Fab Process 2, the inspection data from the visual sensor 200, and the time information sent in advance to the visual sensor 200 to generate a query (sequence SQ320), and sends the query to the database 350 (sequence SQ322). Note that all the information is not necessarily transmitted using an individual query; the information may be divided among and transmitted via a plurality of queries.

The database 350 (DB engine 352) references the data storage area 360 on the basis of the time information provided in a query sent from the PLC 100 to identify the image data 50 stored at the time indicated by the aforementioned time information, and maps the query with the identified image data 50 (sequence SQ324). In addition, the database 360 (DB engine 352) updates the database so that the information related to the mapping is contained therein (sequence SQ324).

Hereafter, the processing in the sequences SQ302 to SQ324 is repeated for each of the workpieces 4. Executing these processes builds the sort of database illustrated in FIG. 3, and uniquely maps the corresponding image data 50 for each of the workpieces 4 with the machining data and the inspection data and vice versa.

K. Other Embodiments

The above-described first through third embodiments exemplify configurations that track the workpieces 4 on the basis of some relationship between the PLC 100 and the visual sensor 200 (e.g., an offset value). However, workpiece tracking is not limited to this method, and any desired configuration may be adopted. That is, as long as there is a mapping between the machining data managed by the PLC 100, and the inspection data managed by the visual sensor 200 and vice versa for the same workpiece 4, the methods for implementing this kind of mapping may include assigning each of the workpieces 4 some kind of identification such as a bar code, a wireless tag, or the like, and creating mappings between the data on the basis of the identification information.

L. Modification Examples

When the above-described embodiments are implemented using a general purpose computer, an operating system (OS) that provides the basic functions of a computer may be installed on the general-purpose computer in addition to programs that provide the various features of the embodiments. In this case, a program according to the embodiments may call the required program modules provided as a part of the OS in a prescribed sequence and/or timing. In other words, there are cases where a program according to the embodiments can run in collaboration with the OS without containing the above-mentioned program modules. Thus, a program according to the embodiments may exclude such kinds of program modules that are a part of the OS.

Additionally a program according to the embodiments may be built-in as a part of another program. Even in this case, the program itself may run in collaboration with said other program without containing the modules that are available in the other program with which the program is combined. That is, a program according to the embodiments may be built-in as a part of this kind of other program.

Finally, the functions provided by executing the program may be implemented in whole or in part as a dedicated hardware circuit.

M. Advantages

According to the embodiments, a unique mapping can be automatically created for the image data 50 corresponding to a workpiece, the machining data, and the inspection data and stored in a database. Therefore, even with a multitude of analysis parameters available, i.e., even with a large amount of data for analysis, analysis can be more efficiently performed on the machining data and the inspection data along with the corresponding image data.

All aspects of the embodiments disclosed should be considered merely examples and not limitations as such. The scope of the present invention is not limited to the above description but to the scope of the claims, and is intended to include all equivalents and modifications allowable by the scope of the claims.

The invention claimed is:

1. A control system configured to gather and analyze, for an object for inspection, information to be stored in a database and image data to be stored in a data storage area during independent operations and collaborative operations, the control system comprising:
  a control device comprising a first processor that executes one or more programs causing the control device to perform operations comprising controlling a process comprising a plurality of stages executed on the object for inspection; and
  an image processing device arranged in communication with the control device, the image processing device comprising a second processor that executes one or more programs for causing the image processing device to perform, for the plurality of stages, the independent operations, the independent operations comprising:
    acquiring image data by taking an image of the object for inspection,
    processing the image data acquired from taking the image of the object for inspection, the processing of the image data comprising determining whether the image data of the object for inspection indicates that the object for inspection is defective, and
    causing the image data acquired by the image processing device to be stored in the data storage area according to designation information specifying a storage destination in the data storage area designated for the object for inspection; wherein
  the information to be stored in the database comprises:
    an attribute value associated with the object for inspection,
    results information comprising a result from the processing of the image data of the object for inspection, and
    the designation information;
  the first processor of the control device and the second processor of the image processing device perform the collaborative operations for storing the information in the database;
  the attribute value is managed by the first processor of the control device;
  the results information is managed by the second processor of the image processing device;

the designation information is managed by one of: the first processor of the control device; and the second processor of the image processing device to enable the collaborative operations such that:
in response to the first processor of the control device managing the designation information, the collaborative operations comprise the second processor of the image processing device sending the results information to the first processor of the control device and receiving the designation information from the first processor of the control device, and
in response to the second processor of the image processing device managing the designation information, the collaborative operations comprise the second processor of the image processing device sending the results information and the designation information to the first processor of the control device;
the collaborative operations further comprise the first processor of the control device creating a unique mapping of the information associated with the object for inspection to be stored in the database and the image data corresponding to the object for inspection stored in the data storage area for the plurality of stages of the process based on the designation information; and
the unique mapping facilitates retrieval of the image data corresponding to the object for inspection from the data storage area and retrieval of the information associated with the object for inspection from the database at each of the plurality of stages of the process.

2. The control system according to claim 1, wherein the first processor of the control device performs operations further comprising providing the second processor of the image processing device with at least one of: identification information; and location information for the image data acquired by the image processing device as the designation information, the identification information created in response to the storing of the image data in the data storage area, and the location information comprising a location in the data storage area where the image data is stored; and.

3. The control system according to claim 1, wherein the second processor of the image processing device performs operations further comprising
causing the image data acquired by the image processing device to be stored in the data storage area in accordance with a preliminarily determined rule, and
providing the designation information corresponding to the stored image data to the first processor of the control device.

4. The control system according to claim 2, wherein the first processor of the control device performs operations further comprising:
sending at least one of: information managed by the control device; and information managed by the image processing device to the database, together with the designation information for specifying the storage destination of the image data stored in the data storage area.

5. The control system according to claim 1, wherein the second processor of the image processing device performs operations further comprising
providing time information to the first processor of the control device comprising a time at which the image data was stored in the data storage area.

6. The control system according to claim 5, wherein the first processor of the control device performs operations further comprising
sending at least one of: information managed by the control device; and information managed by the image processing device to the database together with the time information; and
causing a process to be executed in the database to create a mapping of the information sent by the first processor of the control device and the image data corresponding to the object for inspection based on the time information.

7. A control device configured to communicate with a database for storing information associated with an object for inspection, a data storage area for storing image data, and an image processing device, the control device comprising
a first processor that executes one or more programs causing the control device to perform operations comprising controlling a process comprising a plurality of stages executed on the object for inspection; wherein
the first processor is configured to perform operations comprising:
communicating with the image processing device, the image processing device comprising a second processor that executes one or more programs for causing the image processing device to perform, for the plurality of stages, independent operations comprising:
acquiring image data by taking an image of the object for inspection,
processing the image data acquired from taking the image of the object for inspection, the processing of the image data comprising determining whether the image data of the object for inspection indicates that the object for inspection is defective, and
causing the image data acquired by the image processing device to be stored in the data storage area according to designation information specifying a storage designation in the data storage area designated for the object for inspection;
the information to be stored in the database comprises:
an attribute value associated with the object for inspection,
results information comprising a result from the processing of the image data of the object for inspection, and
the designation information;
the first processor of the control device and the second processor of the image processing device perform collaborative operations for storing the information in the database;
the attribute value is managed by the first processor of the control device;
the results information is managed by the second processor of the image processing device;
the designation information is managed by one of: the first processor of the control device; and the second processor of the image processing device to enable the collaborative operations such that:
in response to the first processor of the control device managing the designation information, the collaborative operations comprise the second processor of the image processing device sending the results information to the first processor of the control device and receiving the designation information from the first processor of the control device, and in response to the second processor of the image processing device managing the designation information, the collaborative operations comprise the second processor of the image processing device sending the results information and the designation information to the first processor of the control device;

the collaborative operations further comprise the first processor of the control device creating a unique mapping of the information associated with the object for inspection to be stored in the database and the image data corresponding to the object for inspection stored in the data storage area for the plurality of stages of the process based on the designation information; and the unique mapping facilitates retrieval of the image data corresponding to the object for inspection from the data storage area and retrieval of the information associated with the object for inspection from the database at each of the plurality of stages of the process.

8. An image processing device configured to communicate with a database for storing information associated with an object for inspection, a data storage area for storing image data, and a control device, the image processing device comprising a second processor that executes one or more programs for causing the image processing device to perform operations comprising:

communicating with the control device, the control device comprising a first processor that executes one or more programs causing the control device to perform operations comprising controlling a process comprising a plurality of stages executed on the object for inspection, and for the plurality of stages, independent operations comprising:

acquiring image data by taking an image of the object for inspection;

processing the image data acquired from taking the image of the object for inspection, the processing of the image data comprising determining whether the image data of the object for inspection indicates that the object for inspection is defective; and causing the image data acquired by the image processing device to be stored in the data storage area according to designation information specifying a storage destination in the data storage area designated for the object for inspection; wherein the information to be stored in the database comprises:

an attribute value associated with the object for inspection, results information comprising a result from the processing of the image data of the object for inspection, and the designation information;

the first processor of the control device and the second processor of the image processing device perform collaborative operations for storing the information in the database;

the attribute value is managed by the first processor of the control device;

the results information is managed by the second processor of the image processing device;

the designation information is managed by one of: the first processor of the control device; and the second processor of the image processing device to enable the collaborative operations such that:

in response to the first processor of the control device managing the designation information, the collaborative operations comprise the second processor of the image processing device sending the results information to the first processor of the control device and receiving the designation information from the first processor of the control device, and in response to the second processor of the image processing device managing the designation information, the collaborative operations comprise the second processor of the image processing device sending the results information and the designation information to the first processor of the control device;

the collaborative operations further comprise the first processor of the control device creating a unique mapping of the information associated with the object for inspection to be stored in the database and the image data corresponding to the object for inspection stored in the data storage area for the plurality of stages of the process based on the designation information; and the unique mapping facilitates retrieval of the image data corresponding to the object for inspection from the data storage area and retrieval of the information associated with the object for inspection from the database at each of the plurality of stages of the process.

9. The image processing device according to claim 8, wherein the second processor of the image processing device is configured to perform operations further comprising sending time information representing a time at which the image data was stored in the data storage area to the first processor of the control device.

10. A control method for a control system configured to gather and analyze, for an object for inspection, information to be stored in a database and image data to be stored in a data storage area, the control method comprising:

controlling a process comprising a plurality of stages executed on the object for inspection by a control device;

taking an image of the object by an image processing device arranged in communication with the control device;

processing, by the image processing device, the image data, the processing of the image data comprising determining whether the image data of the object for inspection indicates that the object is defective;

storing, by the image processing device, the image data in the data storage area according to designation information specifying a storage destination in the data storage area designated for the object for inspection; and performing, by the control device and the image processing device, collaborative operations for storing the information in the database, wherein the information to be stored in the database comprises:

an attribute value associated with the object for inspection, results information comprising a result from the processing of the image data of the object for inspection, and the designation information;

the attribute value is managed by the control device;

the results information is managed by the image processing device;

the designation information is managed by one of: the control device; and the image processing device to enable the collaborative operations such that:

in response to the control device managing the designation information, the collaborative operations comprise the image processing device sending the results information to the control device and receiving the designation information from the control device, and in response to the image processing device managing the designation information, the collaborative operations comprise the image processing device sending the results information and the designation information to the control device;

the collaborative operations further comprise the control device creating a unique mapping of the information associated with the object for inspection to be stored in the database and the image data corresponding to the object for inspection to be stored in the data storage area for the plurality of stages of the process based on the designation information; and the unique mapping facilitates retrieval of the image data corresponding to the object for inspection from the data storage area and retrieval of the information associated with the object for inspection from the database at each of the plurality of stages of the process.

* * * * *